March 23, 1937.  H. SINCLAIR  2,074,346
HYDRAULIC COUPLING
Filed Oct. 1, 1932
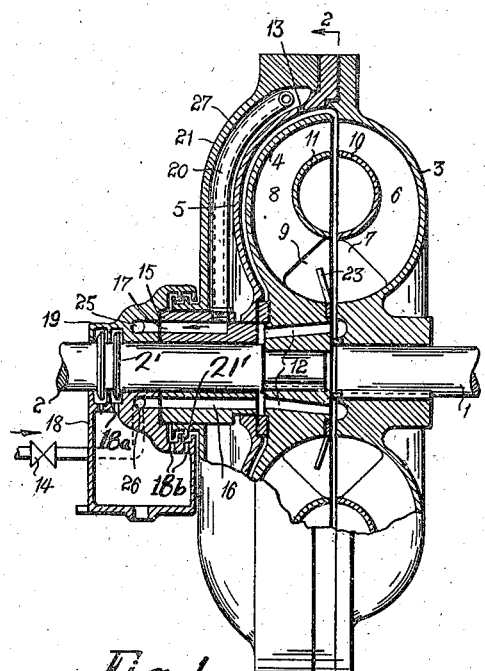
INVENTOR
Harold Sinclair
BY
ATTORNEYS Patented Mar. 23, 1937

2,074,346

UNITED STATES PATENT OFFICE 2,074,346

HYDRAULIC COUPLING

Harold Sinclair, Surbiton Hill, England

Application October 1, 1932, Serial No. 635,795
In Great Britain October 6, 1931

21 Claims. (Cl. 60—54)

The present invention relates to hydraulic couplings or gears of the kinetic type wherein an annular hydraulic circuit for the working liquid is comprised by a driving impeller element co-axial with a driven runner element, the said two elements each comprising a curved shell forming part of the boundary of the hydraulic circuit; and especially but not exclusively to the type of coupling adapted to operate with the hydraulic circuit only partly full of working liquid.

In order that such couplings may be capable of transmitting power with a high efficiency, that is to say, with a low slip, it is necessary to minimize losses due to churning of the working liquid and to the formation of eddies therein during its vortex circulation between the driving and driven elements of the coupling. Consequently, in couplings adapted to operate at a high efficiency, the several elements forming the hydraulic circuit have been so shaped that the hydraulic circuit is bounded by smooth flowing lines, with the result that the stream of working liquid, in circulating between the driving and driven elements, is not subjected to abrupt deflection in its passage through the elements forming the hydraulic circuit.

When high-efficiency couplings of the kind described above are employed in connection with power-transmission systems, it is found that, under certain conditions of operation, violent fluctuations may occur in the value of the torque transmitted by the coupling owing to inherent instability of the stream of liquid circulating between the driving and driven elements of the coupling. For example, in one known arrangement of power transmission system, the coupling, which is provided with means for varying the quantity of liquid in the hydraulic circuit while the coupling is operating, is connected between a driving machine running at a substantially constant speed and a driven machine requiring a high starting torque. With this arrangement, while the driving machine is rotating, the driven machine may be started from rest by admitting liquid to the hydraulic circuit, and the driven machine may be brought to rest by emptying or reducing the quantity of liquid in the hydraulic circuit. It is found however, that when the driven machine has in this way been accelerated or retarded, as the case may be, to a certain speed, the slip being high, torque surges may occur, so that it is not possible to maintain stable conditions of speed of the driven element. The surges may also cause the driving machine to be heavily overloaded, particularly if the inertia of the driven machine is high.

In another arrangement, in which the coupling is employed to connect a source of power of variable speed to a load requiring a high starting torque, it has been found that torque surges may occur when the working chamber of the coupling is only partly filled, when the speed of the source of power is relatively low and when the slip in the coupling is high.

The torque surges above referred to are believed to be caused as follows: When such a coupling is operating with a partly filled hydraulic circuit and at a high slip, the circulation of the working liquid is irregular and indeterminate; as the slip decreases, however, the circulation assumes a definite form, for example, a shallow vortex ring of high velocity. This change in circulation occurs quickly and causes a more or less violent acceleration of the driven element, or conversely a more or less violent surge in power. The stream of liquid may then become attenuated, being subjected to an increased centrifugal force where it passes through the channels of the driven element, and the circulation finally collapses, with the result that the torque falls, and the slip increases again, so that the cycle may be repeated.

An object of the present invention is to provide an improved high-efficiency coupling of the type described which is adapted automatically to prevent the transmission of undesirably high torque during acceleration or deceleration of the load.

A further object is to provide such a coupling in which the inherent instability above referred to is eliminated or reduced to an unimportant amount.

According to the present invention in its broad aspect, in a hydraulic coupling or gear of the type hereinbefore set forth, wherein the boundary of the hydraulic working circuit follows smooth flowing lines, said smooth boundary is interrupted by a discontinuity the magnitude of which is invariable while the coupling is operating and which is so arranged that it is adapted to impede the circulation of a high-velocity liquid vortex in said working circuit, but to offer a relatively slight obstruction to the normal circulation of the liquid at low values of slip.

When my improved coupling is operating at a relatively high slip, and the velocity of circulation of the working liquid is correspondingly high, the discontinuity presented according to the present invention to the circulating liquid forms an obstruction of sufficient magnitude to prevent the attainment of an excessive velocity of circulation, and consequently the transmission of an undesirably high torque; and where the hydraulic circuit is only partly filled with liquid the discontinuity serves either to prevent the attainment of unstable flow conditions or to limit the magnitude of the instability to an unobjectionable value. The obstruction may be so disposed that, when the coupling is operating at a low slip and the circulation velocity is consequently low, it is substantially out of the way of the circulating stream of liquid, or alternatively the obstruction may be so arranged that, even though it lies in the path of the low-velocity circulating stream, it is of such a size and shape that it does not prevent a satisfactorily high maximum efficiency of transmission from being attained.

It has previously been proposed, for example in my U. S. Patent No. 1,831,770, to provide, in a hydraulic coupling of the Föttinger type in which the liquid passages including the driving and driven members form a hydraulic working circuit bounded by smooth flowing lines, means which can be inserted, at will, into the circuit for varying the circulation, of the working liquid. Such couplings are, however, intended to be operated with the working circuit completely or substantially completely filled with working liquid, and they are therefore not subject to the violent torque surges that may occur in couplings of the type in which the liquid content of the working chamber can be varied while the coupling is operating.

The invention will be described by way of example with reference to the accompanying drawing, which shows diagrammatically various forms of hydraulic coupling of the Vulcan (or so-called Föttinger) type and in which Fig. 1 is a part sectional side elevation of one form of coupling taken on the line 1—1 of Fig. 2.

Fig. 2 is a sectional end elevation of a part of this coupling taken on the line 2—2 in Fig. 1.

Fig. 3 is a sectional side elevation of a part of a modified form of coupling taken on the line 3—3 in Fig. 4.

Fig. 4 is a sectional end elevation of a portion of this coupling taken on the line 4—4 in Fig. 3.

Fig. 5 is a sectional side elevation of part of a further form of coupling, and

Fig. 6 is a sectional side elevation of yet another form of coupling.

In the various examples shown the impeller element 3 is attached to the driving shaft 1, while the runner element 4 is attached to the driven shaft 2. A casing member 5 which embraces the shell of the runner element 4 is secured to the periphery of the impeller 3, forming therewith a working chamber for the coupling liquid. The impeller is provided with alternate long and short vanes 7 and 6 respectively, integral with the shell, and these vanes support a core guide member 10. Similarly the runner 4 is provided with alternate long and short vanes 9 and 8 supporting a core guide member 11. Liquid inlet ports 12 are formed through the boss of the impeller 3 or runner 4, and discharge ports 13 serve to exhaust working liquid from the working chamber. A valve 14 in a pipe supplying working liquid under a suitable pressure controls the rate of inflow of liquid to the working chamber.

In the arrangement shown in Figs. 1 and 2, a fixed sleeve 15 surrounds the driven shaft 2, being provided with an inlet port 16 and an exhaust port 17 for the working liquid. The sleeve is secured by bolts, not shown, to a split pipe manifold 18 and 19 in which are formed an inlet passage 26 and an exhaust passage 25 for the working liquid. Thrower rings 2' on the shaft 2 serve to intercept liquid which leaks between this shaft and the manifold 18, 19 and they discharge it to a chamber in the base of the part 18 through drain ports 18a. A stationary scoop tube 20, communicating by the port 17 with the exhaust passage 25, is secured to the sleeve 15 and is accommodated in a chamber 27 formed between the cover 5 and an outer cover 21 secured to the periphery of the casing 5 and suitably sealed with respect to the manifold 18, 19. The outer end of the scoop 20 is turned to face the normal direction of motion of the adjacent parts of the coupling. The discharge ports 13 are of restricted area and communicate between the working chamber and the scoop chamber 27. Thrower rings 21' on the rotatable cover 21 serve to intercept liquid which leaks between this cover and the fixed sleeve 15, and they discharge it to the chamber in the part 18 through drain ports 18b.

A star-shaped baffle 22, provided with radial projections 23, is attached by screws 24 to the boss of the runner 4, the arrangement being such that two projections 23 are accommodated in each space between adjacent long vanes 9.

The operation of this device is, as follows: Liquid is admitted to the coupling through the valve 14, the passage 26 and the ports 16 and 12, and enters the working circuit through the clearance space between the coupling elements. So long as there is any liquid in the working chamber, it is discharged at a limited rate through the ports 13, being scooped out of the scoop chamber 27 by the scoop tube 20 and forced through the port 17 and the exhaust passage 25. Consequently the quantity of liquid in the working chamber can be varied as desired by regulation of the valve 14. A shallow high-velocity vortex ring, such as exists when the liquid content is relatively small and the slip is high, impinges against the projections 23 and is partly disrupted, whereby the attaining of unstable flow conditions is prevented. As the quantity of liquid in the working circuit increases and the velocity of circulation falls with decrease of slip, the effect of the projections 23 becomes less pronounced, and when the coupling is operating under minimum slip conditions these projections offer inappreciable resistance to the hydraulic flow. The action of these projections can be readily varied by bending them farther from or nearer to the plane including the hydraulic junction between the coupling elements. A coupling of this type can be designed to operate with a maximum efficiency of about 98½ per cent when a star baffle is omitted, and the insertion of a star baffle of such a size that the surging effect is rendered negligible, lowers the efficiency by less than 1 per cent.

Referring to the arrangement shown in Figs. 3 and 4, the liquid is discharged from the working chamber through a port 13a formed in the cover 5a, which may be controlled in known manner by a ring valve 33. The admission of liquid to the coupling takes place through a stationary sleeve 30 embracing the shaft 2 and provided with an annular passage 31 communicating by radial ports drilled in the shaft 2 with an axial passage 32 formed in that shaft and communicating in turn with ports 12a leading to the working chamber of the coupling. In this arrangement the long vanes 9 on the runner element are furnished with baffle elements 34 disposed at their discharge ends and so arranged as to mask the part of the liquid passage adjacent the trailing side of these vanes with respect to the normal direction of rotation of the coupling.

In the modification shown in Fig. 5 the discharge passages are formed by tubes 13b leading from an annular channel 40 formed in the core guide member 10a on the impeller 3a, while inlet ports 12b are formed in the boss of the runner 4a. The radially innermost part of the hydraulic circuit is provided with a step 41 facing the normal direction of circulation of the working liquid and having an upper "tread" 42 and a lower "tread" 43, both merging into the smooth boundary of the hydraulic circuit. The corresponding contour of the circuit in a coupling of normal design is indicated by the dotted line 44.

With this modification, the step serves to disrupt a shallow high-velocity stream, but becomes filled with a cushion of more or less dead liquid when a deeper low-velocity stream passes over it, with the result that it offers very slight resistance to the circulation when the coupling is operating at normal full speed with a full circuit and consequently a small slip.

In the arrangement shown in Fig. 6 the part of the hydraulic circuit nearest the axis of rotation of the coupling is again of enlarged section, the radially inner boundary being formed by curves 50 and 51 so disposed as to produce an annular pocket or depression. Attached to one of the coupling elements 3b or 4b, for example, the runner 4b, is an annular baffle 52 secured by screws 53 and of such a diameter that it projects into the hydraulic circuit. Ports 12c serve to admit liquid to the hydraulic circuit. The cross sectional area of the circuit measured between the periphery of this baffle and the radially inner part of the core guide members 10 and 11 corresponds to the cross sectional area required at this point in a coupling of ordinary design, the contour of which is indicated by the dotted line 54. In a modification of this arrangement, the annular pocket or depression may be omitted, and the baffle may project a slight distance into the hydraulic circuit so as to effect a small local reduction in cross-sectional area.

The invention may obviously be applied also to hydraulic gears, that is to say, hydro-kinetic transmission devices wherein the hydraulic circuit includes a fixed reaction member and which therefore effect a change of torque as between the driving and driven shafts.

Having thus described my invention, what I claim and desire to secure by Letters Patent is:

1. A hydraulic coupling of the kinetic type, comprising an annular hydraulic working circuit having a boundary following smooth-flowing lines, and having a liquid inlet, a liquid outlet, and means for effecting a substantial reduction in the quantity of liquid in the coupling at will while the coupling is operating, said smooth boundary having a discontinuity adapted to impede the circulation of a shallow high velocity liquid vortex in said circuit when the coupling is partially filled, but offer a relatively slight obstruction to the normal circulation of the liquid vortex when the coupling is substantially filled.

2. A hydraulic power transmitter of the kinetic type, comprising an annular hydraulic working circuit having a boundary in the form of smooth flowing lines, said smooth boundary being interrupted by a discontinuity which is of invariable magnitude and so arranged that it is adapted to impede the circulation of a shallow high-velocity liquid vortex in said working circuit, but to offer a relatively slight obstruction to the normal circulation of the liquid vortex at low values of slip.

3. A hydraulic coupling or gear of the kinetic type, comprising an annular hydraulic working circuit having a boundary in the form of smooth flowing lines and means for varying the liquid content of said working circuit while the coupling is operating, said means including a duct leading out from a part of said circuit remote from the radially inner boundary thereof and opening into a space which is substantially free from liquid while the coupling is operating, said smooth boundary being interrupted by a discontinuity which is of fixed magnitude and so arranged that it is adapted to impede the circulation of a shallow high-velocity liquid vortex in said working circuit, but to offer a relatively slight obstruction to the deeper circulation of lower velocity that exists under normal low-slip conditions.

4. A hydraulic coupling, or gear, of the kinetic type comprising an impeller element, a runner element, said elements having liquid circuit passages formed therein for the vortex circulation of the coupling liquid, an annular hydraulic working circuit including said elements, a duct for admitting liquid to said circuit, means capable of effecting a substantial reduction in the liquid content of said circuit while the coupling is operating, by utilizing the energy of motion of the coupling liquid, and means rigid with one of said elements and adapted partly to mask the ends of said passages in one of said elements.

5. A hydraulic coupling, or gear, of the kinetic type, having a rotatable impeller element, a rotatable runner element coaxial with said impeller element, an annular hydraulic working circuit including said elements, a hydraulic junction between said elements and disposed in a plane normal to the axis of rotation thereof, liquid transfer means capable of effecting a substantial reduction in the liquid content of said circuit by utilizing the energy of motion of the coupling liquid, and rigid baffle means adapted to mask a part of the section of said junction.

6. A hydraulic coupling of the kinetic type having coaxial rotatable impeller and runner elements juxtaposed to form an annular hydraulic working circuit having a boundary following smooth flowing lines, a return flow junction between said elements and disposed in a plane normal to the axis of rotation thereof, means for transferring liquid to and from said circuit, including a duct capable of effecting a substantially complete emptying of said circuit while the coupling is operating, and means rigid with one of said elements and adapted to mask a part of the section of said junction that is nearest said axis.

7. A hydraulic coupling of the kinetic type having a rotatable impeller element, a rotatable runner element coaxial therewith, liquid circuit passages formed in said elements for the vortex circulation of a coupling liquid, a return flow junction between the runner and impeller passages disposed in a plane normal to the axis of rotation of said elements, means for varying the quantity of liquid in said circuit, the section of said passages being locally enlarged in the neighborhood of said junction to an area greater than that of the section of said passages leading to said neighborhood, whereby at high speed of said coupling the action of centrifugal force on the liquid leaves the portion of the first named section nearest to the axis of rotation substantially free of liquid, and means disposed in said portion of said section for impeding the circulation of liquid in said circuit when the speed of the coupling is lower and the lower action of centrifugal force permits liquid to flow in said portion.

8. A hydraulic coupling of the kinetic type comprising a vaned impeller element and a vaned runner element rotatable about a common axis, said elements having dished annular shells juxtaposed to form an annular hydraulic working circuit, means for effecting a substantial reduction in the liquid content of said circuit while the coupling is operating, a junction between said elements through which liquid flows from said runner to said impeller element, and a baffle fixed to one of said elements and masking a part of the section of said junction.

9. A hydraulic coupling, or gear, of the kinetic type, comprising co-axial and rotatable impeller and runner elements, an annular hydraulic working circuit including said elements, a return-flow junction between said elements disposed in a plane normal to the axis of rotation thereof, and a star-shaped baffle fixed to one of said elements and so disposed as to mask a portion of the section of said junction.

10. A hydraulic coupling, or gear, of the kinetic type, comprising an impeller element, a runner element, liquid vortex circuit passages including said elements and having a boundary in the form of smooth flowing lines, and a discontinuity in said boundary in the form of a step facing the direction of circulatory flow, the upper and lower treads thereof merging into the smooth boundary of said circuit passages.

11. A hydraulic coupling of the kinetic type having a toroidal hydraulic working circuit formed by a rotatable impeller element co-operating with a rotatable runner element, means for effecting a substantial reduction in the liquid content of said working circuit while said coupling is operating, and means adapted to regulate the circulation of working liquid within said circuit so as to minimize torque surges.

12. A hydraulic coupling, or gear, of the kinetic type having an annular working circuit for the vortex circulation of the working liquid, the boundary of said circuit following smooth flowing lines, means for effecting a substantial reduction in the liquid contained in said circuit while said coupling is operating, and means adapted automatically to restrain said circulation from exceeding a critical maximum velocity.

13. A hydraulic coupling of the kinetic type having a toroidal hydraulic working circuit following smooth flowing lines, said circuit being formed by a vaned impeller element coaxial with a vaned runner element, and the junction by which working liquid returns from said runner element to said impeller element being disposed in a plane normal to the axis of rotation of the coupling, means for varying the liquid content of said circuit while said coupling is operating, and an annular baffle fixed to one of said elements and projecting into the radially inner part of said circuit at said junction.

14. A hydraulic coupling of the kinetic type, having a vaned impeller element and a vaned runner element coaxial therewith, said elements conjointly defining a liquid working chamber within which the liquid may circulate, the outlet from the runner element and the inlet to the impeller element being disposed substantially in a plane normal to the axis of the coupling, said coupling having a liquid inlet passage, a liquid outlet passage opening into a space which is substantially free from liquid while the coupling is operating, and means for controlling one of said passages, whereby the quantity of liquid in the coupling may be varied at will while the coupling is running, and one of said elements adjacent to the radially inner side of the working chamber having means projecting into the working circuit for partially obstructing the free circulation of the liquid.

15. A hydraulic coupling of the kinetic type, having a vaned impeller element and a vaned runner element coaxial therewith, said elements conjointly defining a liquid working chamber within which the liquid may circulate, the outlet from the runner element and the inlet to the impeller element being disposed substantially in a plane normal to the axis of the coupling, said coupling having a liquid inlet passage, a liquid outlet passage, and means for controlling one of said passages whereby the quantity of liquid in the coupling may be varied at will while the coupling is running, and an annular series of obstructions rigid with one of said elements adjacent to the radially inner side of the liquid working chamber and projecting radially outwardly part way across the path of flow of the liquid to obstruct to a comparatively slight extent the free circulation of the liquid in said chamber.

16. A hydraulic coupling of the kinetic type having a toroidal hydraulic working circuit following smooth flowing lines, said circuit being formed by a vaned impeller element coaxial with and juxtaposed to a vaned runner element, and the junction by which working liquid returns from said runner element to said impeller element being in the part of said circuit nearest to the axis of said elements, and a baffle member rigidly fixed to one of said elements and projecting into said circuit at the portion of said junction nearest said axis.

17. A hydraulic coupling of the kinetic type having an impeller element coaxial with and juxtaposed to a runner element, the said elements together forming a toroidal working chamber, and each of said elements being provided with vanes between which are disposed passages for the circulation of the working liquid, and means rigidly fixed to one of said elements and serving partly to mask the ends of said passages in one of said elements.

18. A hydraulic coupling of the kinetic type having a toroidal hydraulic working circuit following smooth flowing lines, said circuit being formed by a vaned impeller element coaxial with and juxtaposed to a vaned runner element, and the junction by which working liquid returns from said runner element to said impeller element being in the part of said circuit nearest to the axis of said elements, and a circular plate which is mounted on one of said elements and the peripheral part of which projects into said circuit at said junction.

19. A hydraulic coupling of the kinetic type having a vaned runner element and a vaned impeller element coaxial with and juxtaposed to said vaned runner element, the said two elements together forming an annular hydraulic working circuit having a boundary following smooth flowing lines, and a baffle of invariable magnitude projecting into said circuit from the part of said boundary adjacent to the axis of said elements.

20. A hydraulic coupling of the kinetic type having a vaned runner element and a vaned impeller element coaxial with and juxtaposed to said vaned runner element, the said two elements together forming an annular hydraulic working circuit having a boundary following smooth flowing lines, and a baffle plate disposed between said elements, a part of said plate projecting into said circuit at the part thereof adjacent to the axis of said elements.

21. A hydraulic coupling of the kinetic type having a vaned runner element and a vaned impeller element coaxial with and juxtaposed to said vaned runner element, the said two elements together forming a toroidal working chamber, the boundary of which follows smooth flowing lines and within which a liquid vortex circulates during operation of the coupling, and a baffle member including a part rigidly fixed to one of said elements and another part projecting from said smooth boundary towards the circular axis of said toroidal chamber so as partly to obstruct the vortex circulation.

HAROLD SINCLAIR.